United States Patent [19]

Englund

[11] Patent Number: 5,641,076

[45] Date of Patent: Jun. 24, 1997

[54] STORAGE RACK FOR GLASS SHEETS

[75] Inventor: Carl E. Englund, Lincolnshire, Ill.

[73] Assignees: Woodland Engineering Company, Libertyville, Ill.; Cole-Wiggins Marketing Services, Fort Wayne, Ind.

[21] Appl. No.: 437,610

[22] Filed: May 9, 1995

[51] Int. Cl.⁶ ..................................................... A47G 19/08
[52] U.S. Cl. ............................................ 211/41.14; 206/454
[58] Field of Search ....................... 211/41, 184; 206/454, 206/449

[56] References Cited

U.S. PATENT DOCUMENTS

| | | |
|---|---|---|
| 2,708,037 | 5/1955 | Planet ..................... 211/41 X |
| 3,937,329 | 2/1976 | Hammerel . |
| 4,014,435 | 3/1977 | Rowley et al. . |
| 4,092,815 | 6/1978 | Rowley et al. . |
| 4,182,450 | 1/1980 | Kryger ................... 206/454 X |
| 4,304,336 | 12/1981 | Mays . |
| 4,320,836 | 3/1982 | Brown et al. . |
| 4,733,781 | 3/1988 | Gerlach ........................ 211/41 |
| 4,899,891 | 2/1990 | Sipila et al. . |
| 4,919,277 | 4/1990 | Jeruzal ................... 206/454 X |
| 5,145,073 | 9/1992 | Kitagawa et al. ........... 206/454 X |
| 5,378,093 | 1/1995 | Schroeder .................. 211/41 X |

FOREIGN PATENT DOCUMENTS 3621988  5/1987  Germany ..................... 206/454

Primary Examiner—Kenneth J. Dorner
Assistant Examiner—Jerry Redman
Attorney, Agent, or Firm—George Pappas

[57] ABSTRACT

A storage rack for easily loading and unloading glass sheets such as vehicle windshields and windows. The storage rack includes a lower support member whereupon the glass sheets are selectively placed and supported. A plurality of arms are supported and are adapted to rotate about a common axis of rotation. Each of the arms include a spacer portion and a stop surface. When the glass sheets are loaded on the storage rack, the arms are rotated placing the spacer portions thereof between respective sheets of glass and placing the stop surfaces abutting an edge of the sheet of glass to be first removed. As the glass sheets are individually unloaded, the arms are automatically individually released and gravitationally rotated in a position away from and out of the way of the glass sheet to be next removed. The storage racks are reusable.

25 Claims, 5 Drawing Sheets

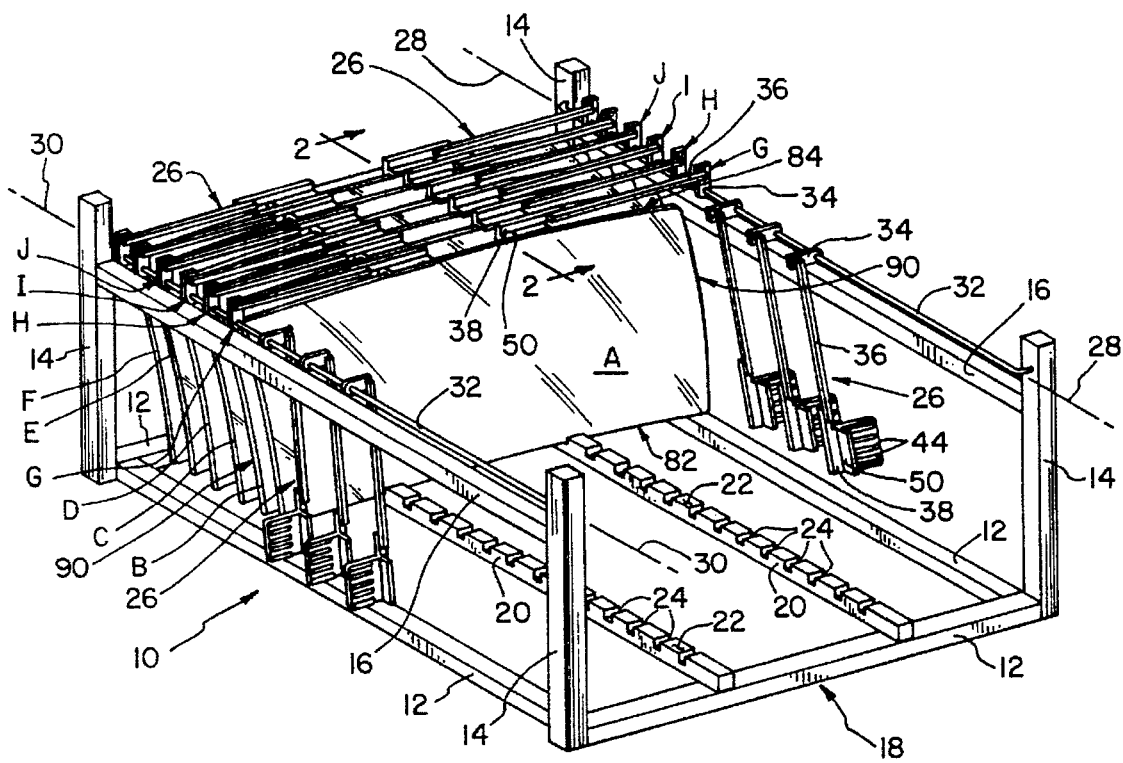
FIG. 1
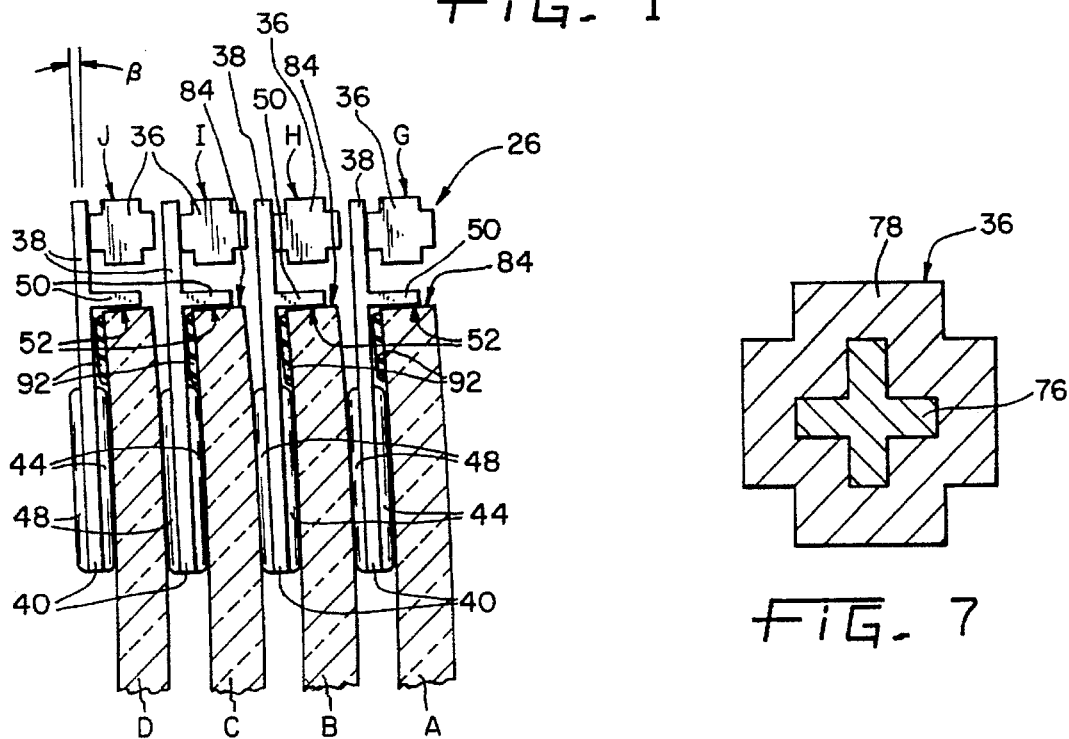
FIG. 2
FIG. 7

STORAGE RACK FOR GLASS SHEETS

TECHNICAL FIELD

The present invention generally relates to the technical field of apparatus for storing glass sheets such as vehicle windshields and other glass windows and other planar glass sheets. More specifically, the present invention relates to a storage rack whereupon glass sheets are selectively loaded in a spaced relation with one another and wherefrom the glass sheets can easily be individually removed with little or no effort being made to remove the spacers located inbetween the glass sheets.

BACKGROUND OF THE INVENTION

Glass sheets such as vehicle windshields and other vehicle windows, as well as window glass sheets, are typically manufactured by glass manufacturers to the customers specifications and then shipped to the customer for their use. The customer then used the glass sheets in assembly of its products. For example, in the case of automotive manufacturing, the glass windshields and/or other vehicle windows are used at the appropriate area of an assembly line whereat they are affixed to the vehicle windshield and other window openings.

As can be appreciated, the various glass sheets must be properly packed for shipment from the glass manufacturer to the customer/user of the glass sheets. The glass sheets must be properly and securely packed to avoid breakage. Additionally, it is desirable that the packing or storage method and apparatus be easily and efficiently usable both when the glass sheets are packed or loaded and, also, when the glass sheets are removed for use.

The glass sheets can be removed from the storage apparatus or rack manually and/or, as is typically the case in automotive manufacturing assembly lines, by robots. In general, these robots are programmed to travel to the storage rack, grab by suction cups or other means the most forward glass sheet, lift the glass sheet out of the storage rack and place it in the appropriate vehicle window opening.

Storage racks have been devised in the past for effectively and efficiently loading the glass to prevent breakage and for easy removal thereof from the storage rack manually or by robots. One example of such a storage rack is disclosed in U.S. Pat. No. 4,899,891. There, a plurality of lever arms are provided and operate to pivotally locate a support arm inbetween the glass sheets as each glass sheet is loaded and comes in contact with a roller attached to the lever arm. Unfortunately, this apparatus is somewhat complicated and, more importantly, does not provide any spacer member inbetween and directly in contact with the successive glass sheets at their upper end thereof thereby leading to potentially undesirable breakage.

Other means of storing glass sheets for transport to end users has been to locate foam and/or other plastic type spacers inbetween the glass sheets as they are loaded onto a storage rack. One or more belts are then wrapped around the glass sheets holding them together for transport. Here, as the end user removes the glass sheets from the storage rack, the foam and/or plastic spacers simply fall or are otherwise removed from the rack. Unfortunately, the foam and/or plastic spacers are typically not reusable and must be discarded. This creates environmental and landfill problems and is, therefore, undesirable.

Accordingly, a need exists for a storage rack apparatus that can easily be loaded and unloaded both manually and by robots, which is effective in preventing breakage of the glass sheets and, further, does not create landfill and environmental problems.

SUMMARY OF THE INVENTION

It is the principal object of the present invention to overcome the above-discussed disadvantages associated with prior glass sheet storage racks and apparatus.

The present invention overcomes the disadvantages associated with prior glass storage apparatus by providing a rack with a support member having a support surface whereupon the glass sheets can be selectively placed and supported. The rack includes a plurality of arms that are rotatably supported on a rod located vertically above the support surface and generally perpendicular and to one side of the glass sheets. Preferably, a second set of plurality of arms are supported and are adapted to rotate about a second rod also located vertically above the support surface and generally perpendicular to the glass sheets but on the other side of the glass sheets from the first rod. Each of the plurality of arms include both a spacer portion adapted to be received inbetween glass sheets, and a stop surface adapted to abut an edge of the sheets of glass.

The glass sheets are removed from the rack in a first-in, last-out order and, as the glass sheets are loaded, the arms are selectively pivoted for placing the arms in position whereat each of the arms' spacer portion is located inbetween two glass sheets and the respective stop surface of each said arm abuts an edge of the glass sheet to be first removed. The spacer portion thus separates the glass sheets from one another and the stop surface abutting the edge of the glass sheet to be first removed effectively prevents the rotation of the arm until after that glass sheet is removed from the storage rack. Accordingly, as the glass sheets are unloaded, upon removal of any one glass sheet from the storage rack, the arms previously placed with the stop surface on the edge of that glass sheet and which also includes the spacer portion between that glass sheet and the glass sheet to be next removed becomes free to rotate about its supporting rod. The arm is then gravitationally pulled rotating downwardly and vertically below its respective supporting rod and out of the way of the glass sheet next to be removed. This process is then repeated until all glass sheets are removed from the storage rack. Further, the racks are reusable and, after all glass sheets are unloaded, the rack is shipped back to the glass manufacturer whereat it is reused for loading glass sheets thereon.

Depending on the size of the glass sheets and other customer assembly line requirements, the pivot rods and the arm stop surfaces can be located and adapted so that the stop surface can abut either the generally vertical or horizontal edges of the glass sheets. The arm holes receiving the pivot rod are preferably flared thereby allowing limited pivotal motion of the arms with respect to the pivot rod in addition to rotational motion. The spacer portions are also preferably provided with a plurality of soft material ribs for coming in contact with the glass sheets and preventing potential scratching thereof. For greater versatility, the arms include a base portion and the spacer portion and stop surfaces thereof are detachably attached to the base portions. Alternatively, an extension arm is provided between the base portion and the spacer portion and stop surfaces for selectively more easily lengthening and locating the spacer portion and stop surface as needed inbetween the glass sheets. The extension arm can be detachably attached to the base portion and/or the spacer portion and stop surfaces.

The extension arm which is generally elongate can further include an inner member surrounded by an outer cover and the inner member can be made of a harder or stiffer material than the outer cover thereby providing greater stability of the spacer portion and stop surface location. Further yet, the center of gravity of the arm is preferably located for causing the extension bracket to be gravitationally pulled at an angle with respect to a vertical plane below the axis of rotation and further out of the way of the glass sheets loaded on the storage rack.

In one form thereof, the present invention is directed to a storage rack for glass sheets and includes a plurality of arms adapted to rotate about a common axis of rotation. Each of the arms include a spacer portion and a stop surface. A support member whereupon glass sheets can be selectively placed and supported is provided and the common axis of rotation is located vertically above the support member. When glass sheets are loaded on the rack, the arms are selectively pivotable placing the spacer portions between respective sheets of glass and placing the stop surfaces abutting an edge of the sheets of glass whereby the glass sheets are separated from one another and the arms are prevented from rotating about the axis of rotation.

Preferably, the glass sheets are removed from the rack in a first-in, last-out order and between any two glass sheets whereat an arm spacer portion is located, the respective stop surface of that arm abuts an edge of the glass sheet to be first removed. Accordingly, upon removing that sheet of glass, the arm with its respective stop surface abutting an edge thereof becomes free to rotate about the axis of rotation and out of the way of the glass sheet to be next removed.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawings wherein:

FIG. 1 is a perspective view of a storage rack for glass sheets constructed in accordance with the principles of the present invention;

FIG. 2 is a partial cross-sectional view taken generally along line 2—2 in FIG. 1;

FIG. 7 is a cross sectional view taken generally along line 7—7 of FIG. 4;

Corresponding reference characters indicate corresponding parts throughout the several views of the drawings.

Figure 3:
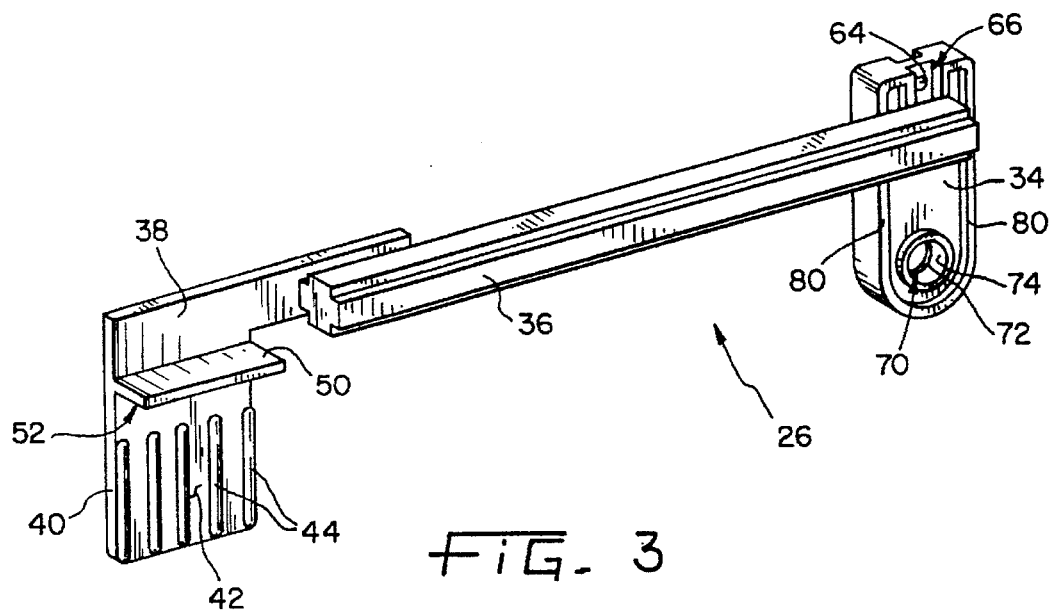
FIG. 3 is a perspective view of a rotatable arm constructed in accordance with the principles of the present invention and also shown in FIG. 1.

The exemplifications set out herein illustrate preferred embodiments of the invention in one form thereof and such exemplifications are not to be construed as limiting the scope of the disclosure or the scope of the invention in any manner.

DETAILED DESCRIPTION OF SPECIFIC EMBODIMENTS

Referring initially to FIG. 1, a storage rack for glass sheets is shown and generally designated by the numeral 10. Storage rack 10 includes a frame made up of rectangular section 12, upright posts 14 extending upwardly at the corners of rectangular section 12 and elongate generally horizontally disposed beams 16 extending between upright posts 14. Beams 16 are provided along the sides of storage rack 10 as shown and also the back thereof (not shown) but not along the front loading and unloading area or opening generally designated by the numeral 18. Rectangular section 12, upright posts 14 and beams 16 are preferably made of square steel tubing and are welded together, although other suitable materials can be used and assembled for creating the same.

Storage rack 10 further includes support members 20 extending between rectangular section 12 from front to back of the storage rack 10. Support members 20 include a support surface 22 preferably made of a soft material such as foam or rubber and upon which glass sheets can be selectively placed and supported. More preferably, support members 20 include a plurality of glass receiving grooves 24 wherein glass sheets are selectively received and effectively prevented from potentially sliding from front to back or side to side. It is noted that support members 20 below the upper softer support surface 22 are made of a sufficiently strong material such as steel for supporting the weight of the glass sheets to be carried thereon.

Storage rack 10 yet further includes rotatable arms generally designated by the numeral 26, a first set of which are adapted to rotate about axis 28 on the right side of storage rack 10 and a second set of which are adapted to rotate about a second axis of rotation 30 located on the left side of storage rack 10. Arms 26 which are rotatable about axis 28 are mirror images of those arms 26 rotatable about axis 30 and operate identical to each other. Keeping this in mind, although in FIGS. 2–14, an arm 26 for the right side of storage rack 10 and rotatable about axis 28 is shown, it is noted that one skilled in the art can readily adapt the teachings thereof for making the mirror image arms as shown in FIG. 1, for example, to rotate about axis 30.

It is further noted that axes 28 and 30 extend through and are coaxial with pivot rods 32 extending between and attached to upright posts 14 from front to back of storage rack 10. Pivot rods 32 are located generally perpendicular to the glass sheets to be loaded on storage rack 10 (glass sheets A–F shown in FIG. 1) and also vertically above support surface 22 and to the left and right sides of the glass sheets as shown. In this manner, glass sheets can be loaded and unloaded from storage rack 10 both through the top thereof and the front area 18.

Referring now more particularly to FIGS. 3–7, rotatable arms 26 include a base portion 34 an extension arm or bracket 36 detachably attachable thereto and extending therefrom and a hand portion 38 detachably attachable to extension arm 36 and extending therefrom. Hand portion 38 includes a spacer portion or member 40, defining a front surface 42 which preferably includes a plurality of contact ribs 44. Spacer portion or member 40 further defines a back surface 46 including a plurality of back contact ribs 48. Hand portion 38 yet further includes a stop projection 50 defining a stop surface 52 which is preferably located generally perpendicular to spacer portion 40.

Hand portion 38 is detachably attachable to extension arm 36 via projecting fingers 54 on extension arm 36 and corresponding holes 56 through hand portion 38. In this regard, projecting fingers 54 include thickened head portions 58 slightly larger than the fingers 54 shaft portion and also slightly larger than the diameter of holes 56. By applying a sufficient amount of force, head portions 58 and fingers 54 are frictionally received through holes 56 and are tightly retained thereat thereby detachably selectively affixing hand portion 38 to extension arm 36.

Figure 4:
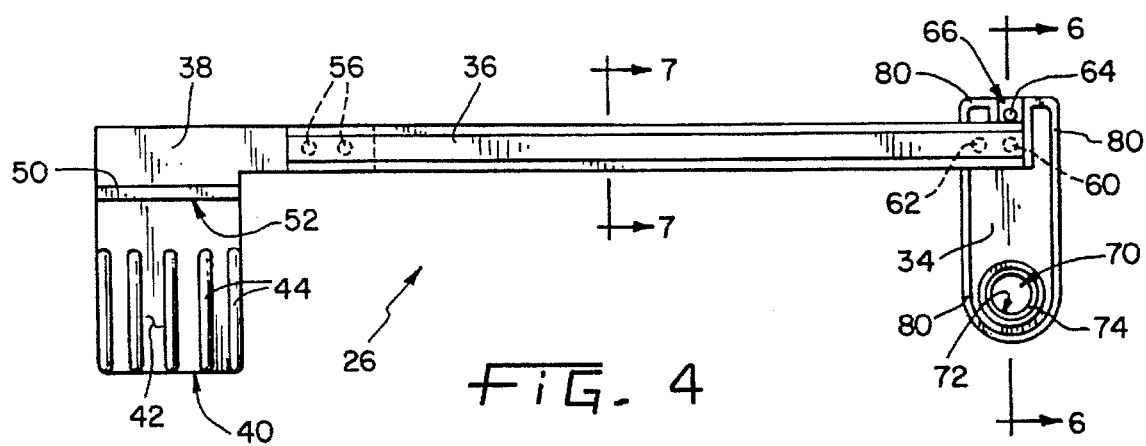
FIG. 4 is a front elevation view of the arm shown in FIG. 3.
Figure 5:
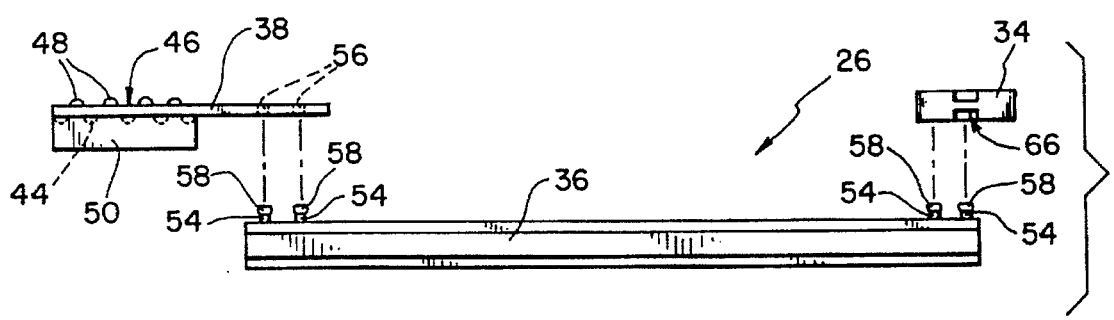
FIG. 5 is a top plan exploded view of the arm shown in FIG. 3.
Figure 14:
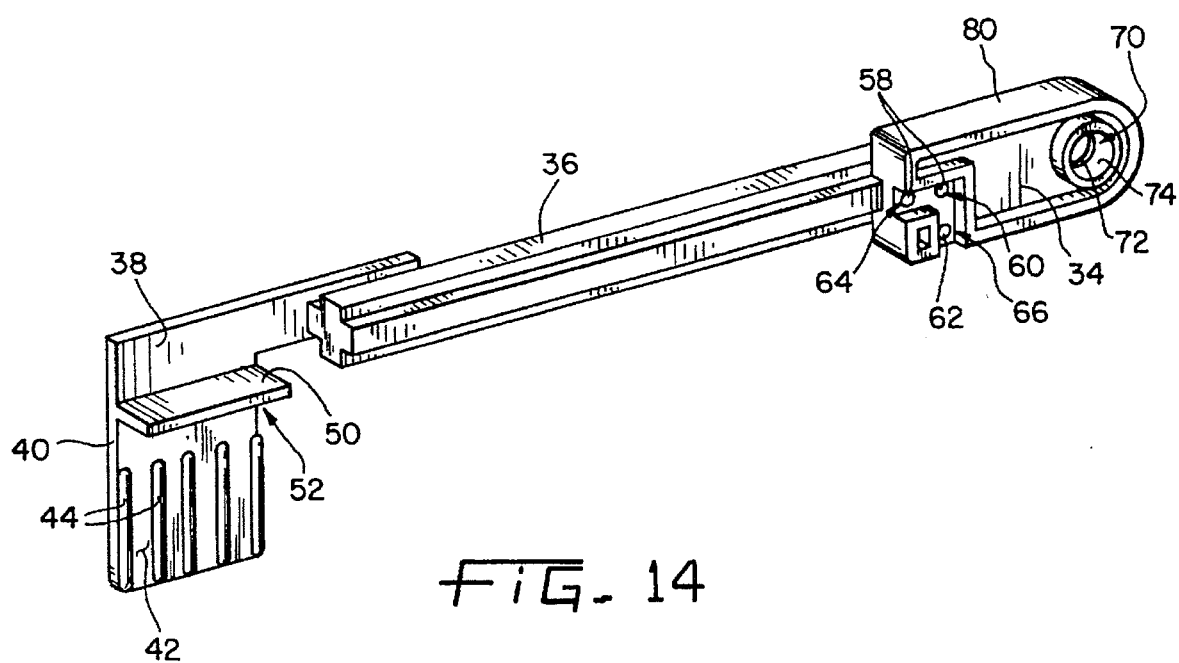

At the other end of extension arm 36 a second set of projecting fingers 54 with thickened portions 58 are provided for selective detachable attachment to base portion 34. Here, fingers 54 are selectively received through either of combination of holes 62 and 60 to form an arm as shown in FIGS. 3–5 or through 64 and 60 to form an arm as shown in FIG. 14. Similar to the holes 56 through hand portion 38, holes 60, 62 and 64 in base portion 34 are slightly smaller than thickened head portions 58 so that a sufficient amount of force causes thickened head portions 58 and projecting fingers 54 to be frictionally received through the holes 60, 62 or 60, 64 of base portion 34 and thereby effectively detachably attaching extension arm 36 to base portion 34.

Figure 6:
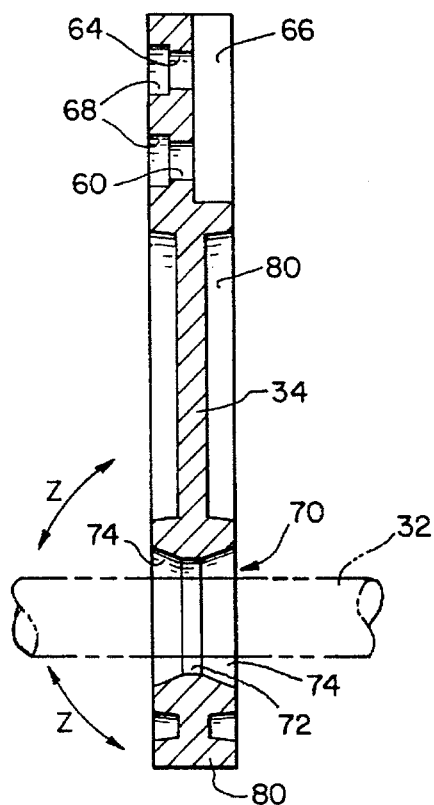
FIG. 6 is a cross sectional view taken generally along line 6—6 of FIG. 4.
Figure 8:
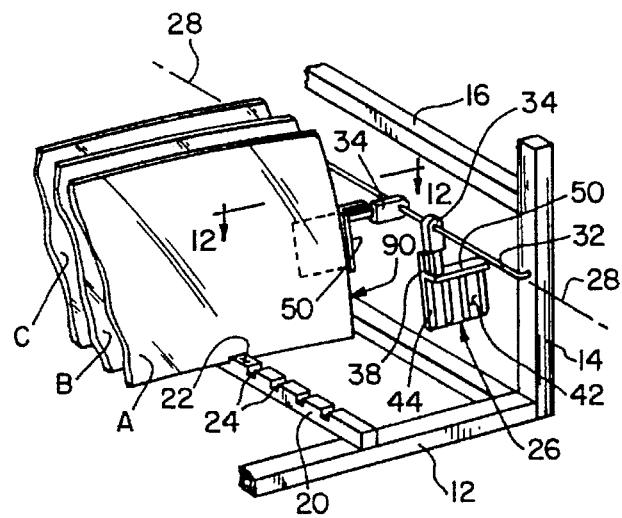
FIG. 8 is a partial perspective view of a storage rack for glass sheets incorporating a second embodiment of rotatable arms constructed in accordance with the principles of the present invention.
Figure 9:
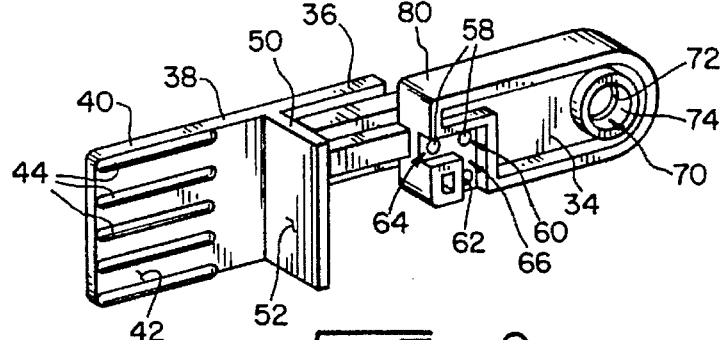
FIG. 9 is a perspective view of a rotatable arm shown in FIG. 8.
Figure 10:
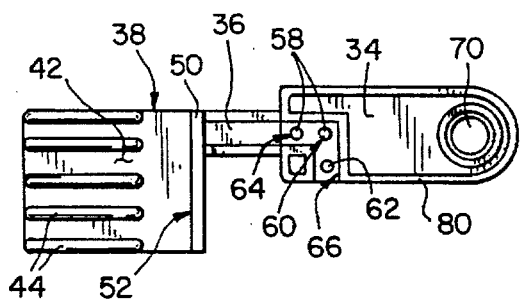
FIG. 10 is a front elevation view of the rotatable arm shown in FIG. 9.
Figure 11:
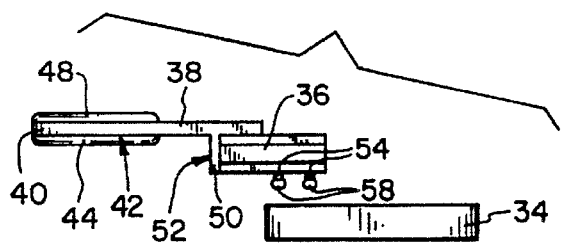
FIG. 11 is a top plan exploded view of the arm shown in FIG. 9.

As best shown in FIG. 6, base portion 34 preferably also includes a recess area 66 that is generally L-shaped over holes 60, 62 and 64 wherein a portion of extension arm 36 is received when attached to base portion 34. Counterbores 68 are provided on the other side of recess 66 and holes 60, 62 and 64. Counterbores 68 are provided for receiving thickened head portions 58 upon attachment of extension arm 36 to base portion 34.

Base portion 34 further includes rotation hole 70 wherethrough pivot rod 32 is received. Rotation hole 70 preferably includes a generally central cylindrical area 72 and frustoconical or flared surfaces or areas 74 extending outwardly therefrom. Pivot rod 32 is somewhat smaller in diameter than the diameter of cylindrical area 72 and, therefore, base portion 34 along with the entire arm 26 is not only capable of rotational motion around pivot rod 32 but also pivotal motion with respect to the pivot rod as generally indicated by the arrows Z.

All of the arm sections, base portion 34, extension arm 36 and hand portion 38 are preferably made by injection molding and are made of nylon materials or plastic materials such as polyvinylchloride. Extension arm 36, depending on the length thereof, can either be made of one material or can be made as shown in FIG. 7, including an inner member 76 made of nylon or other fairly stiff material and an outer cover 78 made of a softer material, such as plastic i.e., polyvinylchloride. In this manner, extension arm 36 can be made significantly longer in a generally inexpensive manner yet retaining its needed rigidity and an outer softer cover to prevent potential scratching of the glass sheets. Additionally, although the base portion 34, extension arm 36 and hand portion 38 are shown detachably attachable to one another so as to be versatile and accommodate various lengths and positions, it is noted that all of these components can be integrally formed together as may be needed and/or only the hand portion 38 or base portion 34 can be made detachably attachable to extension arm 36. Further yet, the specific geometric shapes thereof, for example, the cross shape of extension arm 36 as shown in FIG. 7 and the strengthening perpendicular walls 80 of base portion 34, although desirable in the preferred embodiment, can be modified to meet the needs of the specific application. Other geometric shapes can be devised and used to suit the needs of the specific application and to provide rotatable arms 26 to accomplish the required end result in accordance with the present invention.

Figure 13:
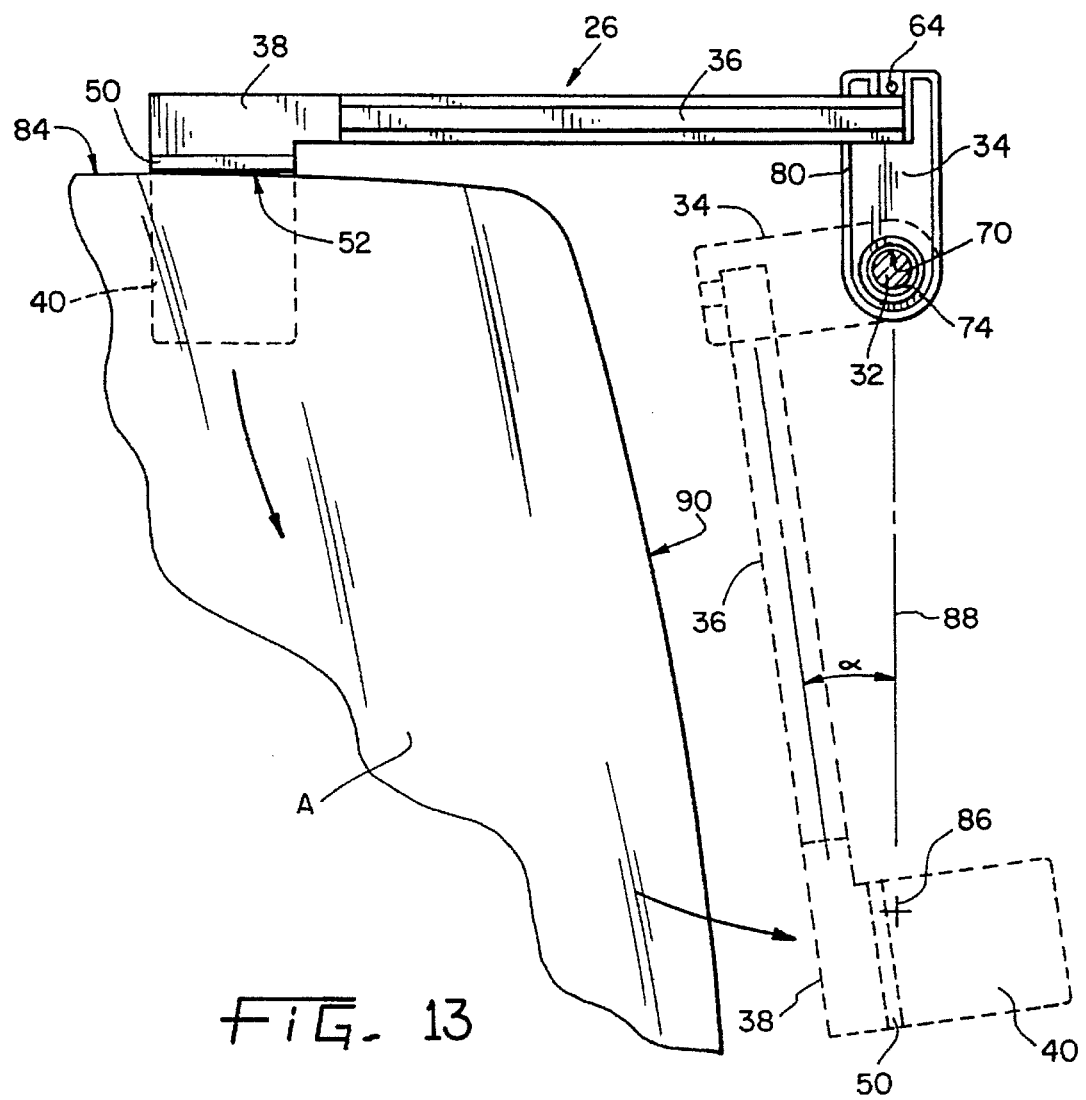
FIG. 13 is a partial front elevation view of the storage rack and glass sheets shown in FIG. 1 and showing the rotatable arm in the glass loaded and unloaded/retracted arm position; and, FIG. 14 is a perspective view of yet another embodiment of a rotatable arm constructed in accordance with the principles of the present invention.

In operation, referring now more particularly to FIGS. 1, 2 and 13, glass sheets such as those indicated by the letters A, B, C, D, E and F are loaded onto the storage rack 10 by placing the bottom edge 82 thereof onto support surface 22 and, preferably, within receiving grooves 24 of support members 20. These glass sheets are loaded so as to be removed from the storage rack 10 in a first-in, last-out order. As the glass sheets are loaded in storage rack 10, arms 26 are rotated upwardly for placing spacer portions 40 inbetween respective sheets of glass and placing the stop surfaces 52 abutting a glass sheet horizontal upper edge 84. More specifically, referring to FIG. 2, as glass sheet D is loaded, arm J is rotated upwardly placing its stop surface 52 on the horizontal upper edge 84 of glass sheet D. Thereafter, as glass sheet C is loaded, arm I is rotated placing the spacer portion 40 thereof inbetween glass sheets D and C and also placing stop surface 52 of arm I on upper horizontal edge 84 of glass sheet C. This process is then repeated for loading additional glass sheets and locating rotatable arms 26 as shown in FIGS. 1 and 2. Finally, a belt can be provided around the entire storage rack 10 and loaded glass sheets (not shown) for helping to retain the glass sheets in position for transport.

It is further noted that because the holes 70 of base portions 34 include flared surfaces 74 and/or because pivot rod 32 is slightly smaller in diameter than annular cylindrical area 72, arms 26, when in position inbetween glass sheets as shown in FIG. 2, are also pivotable at an angle β to accommodate any curvature and/or tilt angle that might be experienced by the inherent glass sheets being loaded and the loading angle on storage rack 10.

After delivery, the glass sheets can be unloaded from storage rack 10 either manually or by mechanical robots. In this regard, after any belting is removed, the glass sheets are removed one at a time by merely grasping, such as by suction cups, the most forward glass sheet (sheet A shown in FIG. 1) lifting off of surface 22 and thereafter removing the glass sheet from storage rack 10 by moving the glass sheet upwardly and/or horizontally through the front loading and unloading area 18 as may be desirable.

Advantageously, as the glass sheets are unloaded, arms 26 rotate downwardly and out of the way so as to allow the next sheet of glass to be unloaded. More specifically, referring to FIG. 2, as glass sheet A is removed, arm G initially may be caused to rotate and move slightly upwardly. However, as soon as stop surface 52 of arm G no longer rests on the horizontal upper edge 84 of glass sheet A, arm G will be gravitationally pulled and will rotate downwardly in a position, as for example, shown in FIG. 1 and as shown in FIG. 13 in dashed lines. In general, the arms 26 are rotated generally below the axis of rotation 28 or 30 and away from the glass sheets. The process of unloading the glass sheets is then repeated until the entire storage rack 10 is unloaded. That is, glass sheet B is unloaded freeing arm H to rotate out of the way and then glass sheet C is removed allowing arm I to rotate downwardly and out of the way, etc. After all the glass sheets are removed from rack 10, it is shipped back to the glass manufacturer for reuse by again loading the rack with glass sheets and reshipping to the customer.

In the embodiment shown in FIGS. 1–5 and FIG. 13, the center of gravity 86 is located on arms 26 in a manner whereby arms 26 are gravitationally pulled at an angle α with respect to a vertical plane 88 below the axis of rotation 28 or 30. In this manner, the extension arm 36 is at an angle α with respect to the vertical and out of the way of the vertical glass edge 90 of the glass sheets. It is noted that although glass edge 90 is stated herein to be vertical or vertically situated, this is intended to mean edges located at angles, for example, 0 to 20 degrees from the exact vertical i.e., vertical plane 88.

Quite often windshields are manufactured with a rubber bead 92 at their perimeter thereof and so as to not interfere therewith, contact ribs 44 and 48 of respective spacer surfaces 42 and 46 are formed so as not to extend all the way to stop surface 52. Accordingly, a small gap is provided as shown in FIG. 2 whereat rubber bead 92 will not be contacted or otherwise interfered with by arms 26 and spacer portions 40.

In a second embodiment as shown in FIG. 14, extension arm 36 is attached to base portion 34 at holes 60 and 64 thereby placing extension arm 36 generally longitudinal with base portion 34. This arm functions substantially identical to the arms shown in FIGS. 1–5 and 14 except that because extension arm 36 is generally tangentially located with respect to the axis of rotation 28 or 30, upon the glass sheets being unloaded, this arm will rotate substantially below the respective axis of rotation 28 or 30 and with extension arm 36 being coplanar with or only at a very slight angle with plane 88.

Figure 12:
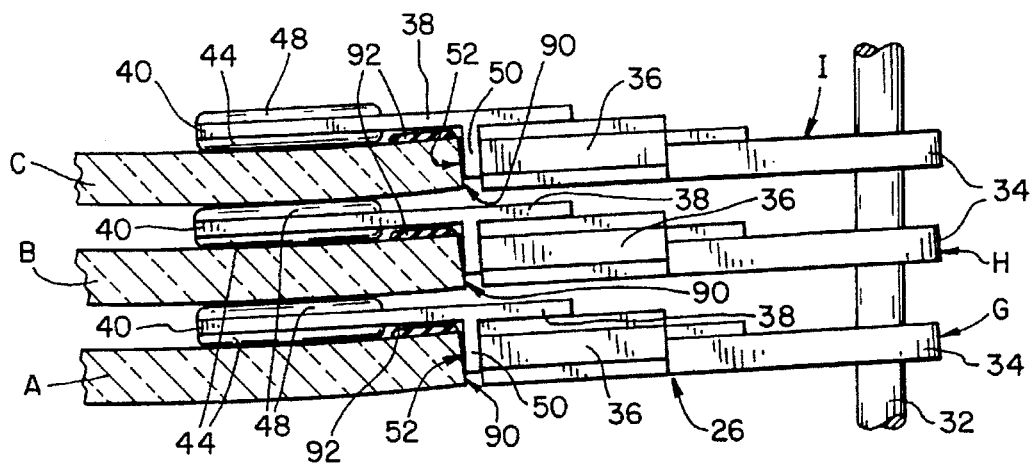
FIG. 12 is a partial cross sectional view taken along line 12—12 of FIG. 8.

Referring now to FIGS. 8–12, a third embodiment is shown wherein the arms 26 include a stop surface 52 adapted to abut the generally vertical edge 90 of the glass sheets. This embodiment is useful where a spacer is, for example, not absolutely necessary at the upper edge of the glass sheets and/or where the storage rack height is limited due to, for example, assembly area restrictions. In this embodiment, contact ribs 44 and 48 along with contact surfaces 40 and 46 of spacer portion 40 are again generally perpendicular to stop surface 52. Here, however, an integral very small extension arm portion 36 is provided and this smaller extension arm 36 portion is detachably attachable to a base portion 34 as with the other embodiments. Similar to the embodiment of FIG. 14, here small extension arm 36 is attached to base portion 34 using holes 60 and 64 and placing the same generally longitudinally with base portion 34. It is noted, however, hand 38 and integral smaller extension arm 36 could be detachably attached to base portion 34 using holes 60 and 62 similar to the embodiment of FIGS. 1–5, but wherein, again, the stop surface 52 would continue to be used for abutting a generally vertical glass edge 90. Finally, as shown in FIG. 12, contact ribs 44 and 48 do not extend to stop surface 52 thereby creating a small gap area whereat the rubber bead 92 running along generally vertical edge 90 can be received without interference thereof. As can be appreciated, this embodiment functions substantially identical to that of those described hereinabove except that the generally vertically situated glass edge 90 is the edge upon which stop surface 52 abuts.

While the invention has been described as having specific embodiments, it will be understood that it is capable of further modifications. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A storage rack for glass sheets comprising:
    a plurality of arms adapted to rotate about a common axis of rotation;
    each of said arms including a spacer portion and a stop surface;
    a support member whereupon glass sheets can be selectively placed and supported;
    wherein said common axis of rotation is located vertically above said support member; and,
    wherein when glass sheets are loaded on said rack, said arms are selectively pivotable placing said spacer portions between respective sheets of glass and placing said stop surfaces abutting an edge of said sheets of glass, whereby said glass sheets are separated from one another and said arms are prevented from rotating about said common axis of rotation.

2. The storage rack of claim 1 wherein said glass sheets can be removed from said rack in a first in last out order and, between any two glass sheets whereat an arm spacer portion is located, the respective stop surface of said arm abuts an edge of the glass sheet to be first removed, whereby upon removing said sheet of glass the arm with its respective stop surface abutting an edge thereof becomes free to rotate about said common axis of rotation.

3. The storage rack of claim 2 wherein said arm stop surfaces are generally perpendicular to said respective spacer portions.

4. The storage rack of claim 2 further including a pivot rod coaxially aligned with said axis of rotation, said arms further including holes wherethrough said pivot rod is received, whereby said arms are supported by and are rotatable about said pivot rod.

5. The storage rack of claim 4 wherein said arm holes are flared thereby allowing limited pivotal motion of said arms with respect to said pivot rod in addition to said rotational motion.

6. The storage rack of claim 2 wherein each of said arms include a base portion adapted to rotate about said axis of rotation and wherein said spacer portion and stop surface are detachably attached thereto.

7. The storage rack of claim 2 further comprising an extension bracket between said base portion and said spacer portion and stop surface.

8. The storage rack of claim 7 wherein said extension bracket is detachably attached to said base portion.

9. The storage rack of claim 7 wherein said extension bracket is generally elongate and includes an inner member surrounded by an outer cover, said inner member made of a stiffer material than said outer cover.

10. The storage rack of claim 7 wherein a center of gravity of said arm is located for causing said extension bracket to be gravitationally pulled at an angle with respect to a vertical plane below said axis of rotation.

11. The storage rack of claim 2 further comprising a plurality of contact ribs on said arm spacer portions for coming in contact with said glass sheets.

12. The storage rack of claim 2 wherein said arm stop surfaces are adapted to abut a generally vertical edge of said glass sheets.

13. The storage rack of claim 2 wherein said arm stop surfaces are adapted to abut a generally horizontal edge of said glass sheets.

14. The storage rack of claim 2 wherein said axis of rotation is located generally perpendicular and to a side of said glass sheets that may be loaded on said storage rack, whereby upon said arms becoming free to rotate said arms are gravitationally rotated generally below said axis of rotation and away from said glass sheets.

15. The storage rack of claim 2 wherein a plurality of glass receiving grooves are located on said support member, whereby said glass sheets can be selectively received in said glass receiving grooves.

16. The storage rack of claim 1 further including a pivot rod coaxially aligned with said axis of rotation, said arms further including holes wherethrough said pivot rod is received, whereby said arms are supported by and are rotatable about said pivot rod.

17. The storage rack of claim 16 wherein said arm holes are flared thereby allowing limited pivotal motion of said arms with respect to said pivot rod in addition to said rotational motion.

18. The storage rack of claim 1 further comprising an extension bracket between said base portion and said spacer portion and stop surface.

19. The storage rack of claim 18 wherein a center of gravity of said arm is located for causing said extension bracket to be gravitationally pulled at an angle with respect to a vertical plane below said axis of rotation.

20. The storage rack of claim 1 wherein each of said arms include a base portion adapted to rotate about said axis of rotation and wherein said spacer portion and stop surface are detachably attached thereto.

21. The storage rack of claim 1 wherein said arm stop surfaces are adapted to abut a generally horizontal edge of said glass sheets.

22. The storage rack of claim 1 wherein said arm stop surfaces are adapted to abut a generally vertical edge of said glass sheets.

23. The storage rack of claim 1 wherein said axis of rotation is located generally perpendicular and to a side of said glass sheets that may be loaded on said storage rack, whereby upon said arms becoming free to rotate said arms are gravitationally rotated generally below said axis of rotation and away from said glass sheets.

24. The storage rack of claim 1 wherein a plurality of glass receiving grooves are located on said support member, whereby said glass sheets can be selectively received in said glass receiving grooves.

25. The storage rack of claim 1 further comprising a second set of plurality of arms supported and adapted to rotate about a second common axis of rotation located vertically above said support member, said second plurality of arms also each including a spacer portion and a stop surface, said first axis of rotation located generally perpendicular and to one side of said glass sheets that may be loaded on said storage rack and said second axis of rotation located generally perpendicular and to the other side of said glass sheets that may be loaded on said storage rack.

* * * * *